US006042627A

United States Patent [19]

Pyzik et al.

[11] Patent Number: 6,042,627

[45] Date of Patent: Mar. 28, 2000

[54] ALUMINUM-BORON-CARBON ABRASIVE ARTICLE AND METHOD TO FORM SAID ARTICLE

[75] Inventors: Aleksander J. Pyzik; Uday V. Deshmukh, both of Midland; Robert D. Krystosek, Auburn, all of Mich.

[73] Assignee: The Dow Chemical Company, Midland, Mich.

[21] Appl. No.: 09/069,531

[22] Filed: Apr. 29, 1998

Related U.S. Application Data

[60] Provisional application No. 60/044,362, Apr. 29, 1997.

[51] Int. Cl.[7] .......................... B24D 17/00; C22C 29/02

[52] U.S. Cl. ............................ 51/309; 51/307; 51/293; 419/14; 419/15; 419/17; 419/27; 419/45; 501/87; 501/93; 501/96.3

[58] Field of Search ........................ 51/309, 307, 293; 75/236, 237, 238, 241, 244; 419/14, 15, 17, 27, 45; 501/87, 93, 96.3, 96.4, 98.4

[56] References Cited

U.S. PATENT DOCUMENTS

| | | | |
|---|---|---|---|
| 4,605,440 | 8/1986 | Halverson et al. | 75/238 |
| 4,702,770 | 10/1987 | Pyzik et al. | 75/236 |
| 4,718,941 | 1/1988 | Halverson et al. | 75/236 |
| 4,843,938 | 7/1989 | Hideo | 84/1.19 |
| 4,961,778 | 10/1990 | Pyzik et al. | 75/230 |
| 5,039,633 | 8/1991 | Pyzik et al. | 501/93 |
| 5,143,540 | 9/1992 | Pyzik et al. | 75/233 |
| 5,298,468 | 3/1994 | Pyzik | 501/87 |
| 5,394,929 | 3/1995 | Pyzik et al. | 164/97 |
| 5,508,120 | 4/1996 | Pyzik et al. | 428/688 |
| 5,521,016 | 5/1996 | Pyzik et al. | 428/568 |
| 5,595,622 | 1/1997 | Pyzik et al. | 156/89 |

*Primary Examiner*—Michael Marcheschi
*Attorney, Agent, or Firm*—Kevin J. Nilsen

[57] ABSTRACT

An aluminum-boron-carbon abrasive article is comprised of at least three phases selected from the group consisting of: $B_4C$; $AlB_2$; $AlB_{12}$; $AlB_{12}C_2$; $Al_4C_3$; $AlB_{24}$,$C_4$; $Al_4B_{1-3}C_4$; $AlB_{24}C_4$ and $Al_4BC$. At least a portion of the surface of the abrasive article is comprised of abrasive grains of at least one phase selected from the group consisting of $AlB_{24}C_4$, $Al_4BC$ and $AlB_2$, where the abrasive grains have an average grain size that is at least about two times greater than the average grain size of the grains containing boron and carbon within the abrasive article. The aluminum-boron-carbon abrasive article of claim 1 is prepared by heating, under a vacuum or inert atmosphere, a body comprised of at least one boron containing phase and at least one carbon containing phase in the presence of a separate source of aluminum, such as aluminum metal or alloy thereof. The boron and carbon containing phase each are selected from the group consisting of: $B_4C$; $AlB_2$; $AlB_{12}$; $AlB_{12}C_2$; $Al_4C_3$; $AlB_{24}$,$C_4$; $Al_4B_{1-3}C_4$; $AlB_{24}C_4$ and $Al_4BC$. The body is heated with the separate source of aluminum, such that at least a portion of the surface of the body is contacted by liquid or vaporous aluminum for a time and temperature sufficient to form the aluminum-boron-carbon abrasive article.

4 Claims, No Drawings

ALUMINUM-BORON-CARBON ABRASIVE ARTICLE AND METHOD TO FORM SAID ARTICLE

CROSS-REFERENCE TO RELATED APPLICATION

This application claims the benefit of U.S. Provisional Application Ser. No. 60/044,362, filed Apr. 29, 1997.

FIELD OF THE INVENTION

The invention relates to an abrasive article containing compounds of boron, carbon and aluminum and method to form the abrasive article.

BACKGROUND OF THE INVENTION

Generally, abrasive articles, such as grinding wheels, are formed by bonding hard abrasive grit (e.g., SiC, $B_4C$ or diamond grit) in a resinous binder, such as phenol-formaldehyde resins, or the grit is brazed onto a metal substrate. Because of the resin bond, resinous grinding wheels generally (1) cannot be used at high temperatures, (2) wear by removal of grit from the resinous material before the wearing out of the grit and (3) fail, during grinding, to hold shapes previously dressed into the wheel. Similarly, because of the brazed metal bond, brazed grinding wheels generally (1) cannot be used at high temperatures, (2) fail due to loss of the grit from the brazed bond and (3) if the wheel is to be reused, the wheel requires extensive refinishing of the metal substrate before applying new grit.

Therefore, it would be desirable to provide an abrasive article, such as a grinding wheel, that addresses the aforementioned problems with prior art abrasive articles.

SUMMARY OF THE INVENTION

A first object of this invention is an aluminum-boron-carbon abrasive article comprising: at least three phases selected from the group consisting of: $B_4C$; $AlB_2$; $AlB_{12}$; $AlB_{12}C_2$; $Al_4C_3$; $AlB_{24}$,$C_4$; $Al_4B_{1-3}C_4$; $AlB_{24}C_4$ and $Al_4BC$, wherein at least a portion of a surface of the article is comprised of abrasive grains of at least one phase selected from the group consisting of $AlB_{24}C_4$, $Al_4BC$ and $AlB_2$, the abrasive grains having an average grain size that is at least about two times greater than the average grain size of the grains containing boron and carbon within the abrasive article.

A second object of this invention is a method to prepare an aluminum-boron-carbon abrasive article comprising: heating, under a vacuum or inert atmosphere, a body comprised of at least one boron containing phase and at least one carbon containing phase, the boron and carbon containing phase each being selected from the group consisting of: $B_4C$; $AlB_2$; $AlB_{12}$; $AlB_{12}C_2$; $Al_4C_3$; $AlB_{24}$,$C_4$; $Al_4B_{1-3}C_4$; $AlB_{24}C_4$ and $Al_4BC$, in the presence of a separate source of aluminum such that at least a portion of the surface of said body is contacted by liquid or vaporous aluminum for a time and temperature sufficient to form the aluminum-boron-carbon abrasive article of the first embodiment.

The abrasive article of this invention has abrasive grains positioned at the surface of the body (i.e., grit) that are a part of the body and, as such, the abrasive article typically wears by wearing the individual grains as opposed to the abrasive grit falling out of the binding material (e.g., resin grinding wheels). The present abrasive article can also be repetitively refurbished by heating the worn abrasive article in the presence of a separate aluminum source. Finally, since the abrasive article may predominately be ceramics having high melting or decomposition temperatures (e.g., $B_4C$), the abrasive article may be used at high temperatures. The abrasive article may be used, for example, as a grinding wheel, dressing wheel, form wheel, saw, reamer, hone or sharpening stone.

DETAILED DESCRIPTION OF THE INVENTION

The Abrasive Article

The abrasive article of this invention is comprised of at least three phases selected from the group consisting of: $B_4C$; $AlB_2$; $AlB_{12}$; $AlB_{12}C_2$; $Al_4C_3$; $AlB_{24}$, $C_4$; $Al_4B_{1-3}C_4$; $AlB_{24}C_4$ and $Al_4BC$, wherein at least a portion of a surface of the article is comprised of abrasive grains of $AlB_{24}C_4$, $Al_4BC$, $AlB_2$ or combination thereof that have an average grain size that is at least about two times greater than the average grain size of the grains containing boron and carbon within the article.

The article contains at least three phases described above. Generally, the ceramic phases (i.e., $B_4C$; $AlB_2$; $AlB_{12}$; $AlB_{12}C_2$; $Al_4C_3$; $AlB_{24}$, $C_4$; $Al_4B_{1-3}C_4$; $AlB_{24}C_4$ and $Al_4BC$) are present in the article as grains that are faceted. The article may also contain filler ceramic phases that are present in the article as isolated grains or as part of clusters of grains of the above ceramic phases. Filler is material which has no, or significantly lower, reactivity than the aforementioned ceramic phases with aluminum. When the article contains filler, the amount of filler in the article preferably is an amount from about 0.1 to 50 percent by volume of the article. More preferably the amount of filler, when present, is between about 1 to 25 percent by volume of the article. Representative fillers include titanium diboride, titanium carbide, silicon carbide, aluminum oxide and silicon boride.

A metal phase may be present in the article and, depending on the amount present in the article, may be present as a matrix phase surrounding the ceramic grains or may be present as isolated pockets at the junctions between ceramic grains. Generally, the amount of metal phase is less than about 30 percent of the article. Preferably the amount of metal is at most about 15 percent preferably at most about 10 percent and most preferably at most about 5 percent by volume of the article. Examples of metals that may be present in the body include aluminum, copper, iron, cobalt, nickel and alloys of each of these. Preferably the metal is aluminum, copper or alloys thereof. More preferably the metal is aluminum or alloy thereof.

The average grain size of the grains containing boron and carbon within the article (i.e., grains not at the surface of the article) is generally at most about 200 micrometers equivalent spherical diameter. Preferably the average grain size within the article is at most about 100 micrometers, more preferably at most about 75 micrometers, even more preferably at most about 50 micrometers and most preferably at most about 25 micrometers to at least about 0.25 micrometer, more preferably at least about 0.5 micrometer and most preferably at least about 1 micrometer equivalent spherical diameter. Generally, the largest grain is no larger than about 200 percent of the average grain size and the smallest grain is generally no smaller than about 10 percent of the average grain size. The grain size and phase may be determined by known metallographic and quantitative electron microscopy echniques such as those described by K. J. Kurzydtowski nd B. Ralph in *The Quantitative Description*

*of the Microstructure of Materials*, CRC Press, Boca Raton, 1995, incorporated herein by reference. A particular method that may be used to determine the grain size is quantitative stereology of a scanning electron micrograph of a polished section of the body using the intercept method described by Underwood in *Quantitative Stereology*, Addison-Wesley, Reading, Mass. (1970), incorporated herein by reference.

Examples of grains containing boron and carbon within the body are grains of the phases previously described (e.g., $B_4C$; $AlB_2$; $AlB_{12}$; $AlB_{12}C_2$; $Al_4C_3$; $AlB_{24}$,$C_4$; $Al_4B_{1-3}C_4$; $AlB_{24}C_4$ and $Al_4BC$) .

At least a portion of a surface of the article is comprised of abrasive grains that are $AlB_{24}C_4$, $Al_4BC$, $AlB_2$ or combination thereof, where these grains have an average grain size that is at least about double the average grain size of the grains containing carbon and boron within the article. The particular phase or phases of these abrasive grains may be altered to suit a particular abrasive application by varying the conditions to form the article as described herein. The phase of the abrasive grains and amount of each may be determined by the same techniques described in the previous paragraph. Generally, when a harder material is to be worked upon by the abrasive article, the abrasive grains are preferred to be the harder phase ($AlB_{24}C_4$). When the abrasive is to be used to polish or work upon softer materials, the abrasive grains are preferred to be the softer phase ($Al_4BC$).

The portion of a surface of the article comprised of the abrasive grains may be any portion such that a useful abrasive article is formed. For example, when the abrasive article is a cut off saw blade (i.e., thin disk with a hole in the middle of the disk for mounting), the surface that is covered may be the outer edge or outer edge and a small portion of each face of the disk adjacent to the outer edge of the disk. Similarly, when the abrasive article is a grinding wheel, the outer edge of the wheel may be the only surface portion that is covered by the abrasive grains. Generally, at least about 1 percent by area of the entire surface of the article is comprised of the abrasive grains.

Within the area of the surface comprised of the abrasive grains, the percentage by area of this surface that are the abrasive grains of this invention is dependent on the particular application and may vary over a large range. Typically, at least about 10 percent to at most about 90 percent of the area of this surface of the article are the abrasive grains. Preferably at least about 15 percent, more preferably at least about 25 percent and most preferably at least about 35 percent to preferably at most about 85 percent, more preferably at most about 80 percent and most preferably at most about 75 percent of the area of this surface are the abrasive grains.

Again, depending upon the application, the abrasive grains may have a small average grain size, provided that the abrasive grains protrude from the surface sufficiently to provide adequate abrasive characteristics, to a size that is not so big that during operation the grain tends to pull out of the article. Regardless of the absolute size, the abrasive grains must have an average size that is at least about double that of the average grain size of the grains containing boron and carbon within the article, so as to provide sufficient abrasive characteristics. Desirably, the average grain size of the abrasive grains is at least about 5 times greater than the average grain size of the grains containing boron and carbon within the article. Preferably the average grain size of the abrasive grains is at least about 10, more preferably at least about 25, even more preferably at least about 100 times to preferably at most about 10,000 times and more preferably at most about 1000 times greater than the average grain size of the grains containing boron and carbon within the article.

To retain the abrasive grains during operation, it is desirable for the article to be substantially dense, which corresponds to a density of at least about 90 percent of theoretical. Preferably the article has a density of at least about 95 percent, more preferably at least about 98 percent and most preferably at least about 99 percent of theoretical density, as described on page 530 of *Introduction to Ceramics 2nd Ed.*, W. D. Kingery et al., John Wiley and Sons, New York, 1976.

Method to Prepare The Abrasive Article

In forming the abrasive article, a body comprised of at least one boron containing phase and at least one carbon containing phase is heated, under a vacuum or inert atmosphere, in the presence of a separate source of aluminum. The boron containing phase and the carbon containing phase are each selected from the group consisting of: $B_4C$; $AlB_2$; $AlB_{12}$; $AlB_{12}C_2$; $Al_4C_3$; $AlB_{24}$, $C_4$; $Al_4B_{1-3}C_4$; $AlB_{24}C_4$ and $Al_4BC$. During the heating of the body, at least a portion of the surface of the body is contacted by either liquid or vaporous aluminum for a time and temperature sufficient to form the aluminum-boron-carbon abrasive article.

The Body:

Bodies suitable to be contacted by aluminum include those known in the art, such as densified boron carbide bodies described on pages 207–209 of *State of the Art Boron Carbide-A Comprehensive Review*; F. Thevenot, *J. Eur. Cer. Society*, pages 205–225, Vol. 6, 1990 and aluminum-boron carbide composite bodies described in U.S. Pat. Nos. 4,605,440; 4,702,770; 4,718,941; 4,843,938; 4,961,778; 5,039,633; 5,143,540; 5,298,468; 5,394,929; 5,521,016; 5,508,120 and 5,595,622, each incorporated herein by reference. Preferably the body that is contacted with aluminum is an aluminum-boron carbide 15 composite body as described herein and in U.S. Pat. No. 5,595,622, col. 2, lines 43–67; cols. 3 and 4 and col. 5, lines 1–51.

The body contacted by aluminum may be made by any convenient or known powdered metal or ceramic processing technique, wherein a shaped body is formed followed by a consolidation technique(s) and, if desired, finishing the body before contacting it with aluminum. Two typical consolidation routes which may be used to form the body are (1) infiltrating a porous ceramic particulate body (greenware) with metal and (2) densifying a porous particulate body (greenware) containing particulates such as boron carbide. The infiltrated or densified body may then be finished (i.e., machined) by techniques, such as diamond grinding, laser machining and electro-discharge machining. Before being heated and contacted with the separate source of aluminum, the body may also be heat treated to alter the microstructure of the consolidated composite. Preferably the body is made by infiltration.

The powder used to make the body, typically, has an average particle size by weight of at most about 50 micrometers, preferably at most about 15 micrometers, more preferably at most 10 microns and most preferably at most 5 microns. The particles may be in the shape of platelets, rods or equiaxed grains. The particles of the powder desirably have a particle diameter within a range of 0.1 to 10 micrometers.

Suitable shaping methods to form greenware (i.e., a porous body made up of particulates) for infiltrating or densifying include known methods such as slip or pressure casting, pressing and plastic forming methods (e.g., jiggering and extrusion). The shaping methods may include steps such as mixing of components, such as ceramic powder, metal powder, dispersants, binders and solvent, and removing, if necessary, solvent and organic additives, such as dispersants and binders, after shaping of the greenware. Each of the above methods and steps are described in more detail in *Introduction to the Principles of Ceramic Processing*, J. Reed, J. Wiley and Sons, N.Y., 1988, incorporated herein by reference.

The metal-ceramic particulate greenware may be densified into the CMC by techniques such as vacuum sintering, atmospheric pressure (pressureless) sintering, pressure assisted sintering, such as hot pressing, hot isostatic pressing and rapid omni directional compaction and combinations thereof, each pressure assisted technique is further described in *Annu. Rev. Mater. Sci.,* 1989, [19], C. A. Kelto, E. E. Timm and A. J. Pyzik, pp. 527–550, incorporated herein by reference.

The greenware is densified under conditions of time, atmosphere, temperature and pressure sufficient to densify the greenware to form a substantially dense body (i.e., greater than about 90 percent of theoretical density). If a metal is present, the temperature is typically greater than about 75 percent of the melt temperature in degrees C of the metal but less than a temperature where substantial volatilization of the metal occurs. For example, the densification temperature for an aluminum-boron carbide system is preferably between 500° C. to 1350° C. The time is desirably as short as possible. Preferably the time is at most about 24 hours, more preferably at most about 2 hours and most preferably at most about 1 hour. The pressure is desirably ambient or atmospheric pressure. The atmosphere is desirably one that does not adversely affect the densification or chemistry of the body being formed.

Preferably the body is produced by infiltrating a porous body containing powder or powders of a ceramic phase previously described (e.g., $B_4C$; $AlB_2$; $AlB_{12}$; $AlB_{12}C_2$; $Al_4C_3$; $AlB_{24}$,$C_4$; $Al_4B_{1\text{-}3}C_4$; $AlB_{24}C_4$ and $Al_4BC$) with a metal, thus forming a composite. The infiltrated body may be further consolidated by techniques described hereinabove. More preferably the ceramic of composite also reacts with the metal, thus forming a new ceramic phase in the dense composite (i.e., chemically reactive system). A preferred embodiment of a chemically reactive system is the infiltration of boron carbide with aluminum or alloy thereof, as described below, and in U.S. Pat. Nos. 5,508,120; 5,521,016 and 5,394,929, each previously incorporated herein by reference.

Infiltration involves forming a porous ceramic preform (i.e., greenware) prepared from ceramic powder described in the previous paragraph by a shaping technique, also previously described, such as slip casting (i.e., a dispersion of the ceramic powder in a liquid) or pressing (i.e., applying pressure to powder in the absence of heat) and then infiltrating a liquid metal into the pores of the preform. Infiltration is the process in which a liquid metal fills the pores of a preform in contact with the metal. Infiltration of the porous preform may be performed by any convenient method for infiltrating a metal into a preform body, such as vacuum infiltration, pressure infiltration and gravity/heat infiltration. Examples of infiltration are described by U.S. Pat. Nos. 4,702,770 and 4,834,938, each previously incorporated herein by reference.

The temperature of infiltration is dependent on the metal (e.g., aluminum, copper and alloys thereof) to be infiltrated. Infiltration is preferably performed at a temperature where the metal is molten but below a temperature at which the metal rapidly volatilizes. For example, when infiltrating aluminum or an alloy thereof into a preform, the temperature is preferably at most about 1200° C., and more preferably at most about 1100° C. and preferably at least about 750° C., and more preferably at least about 900° C. The infiltration time can be any time sufficient to infiltrate the ceramic preform resulting in the body to be contacted with aluminum. The atmosphere can be any atmosphere which does not adversely affect the infiltration of metal or development of the body. Exemplary atmospheres include a noble gas or vacuum.

The preform may contain a ceramic filler material previously described. For example, when a boron carbide preform contains filler, the preform preferably contains from 70 to 95 wt. percent $B_4C$ and from 5 to 30 wt. percent ceramic filler. The percentages are based upon total preform weight.

In making the preferred aluminum-boron carbide body, a porous boron carbide preform is desirably baked at a temperature of at least 1400° C. prior to infiltration in an atmosphere such as a noble gas or vacuum. Generally, the preform is baked for at least 15 minutes, desirably at least 30 minutes and preferably two hours or more. The baked porous boron carbide preform is then infiltrated with aluminum or alloy thereof by a suitable method, such as those known in the art and previously described, to form the body to be contacted with a separate source of aluminum.

The body may be subjected to an additional (post-infiltration) heat treatment in the absence of a separate source of aluminum to improve, for example, the body's strength. As an illustration, the boron carbide-aluminum infiltrated composite is heat treated at a temperature within a range of from about 660° C. to about 1250° C., preferably from about 660° C. to about 1100° C. and more preferably from about 800° C. to about 950° C., for a time sufficient to allow slow reactions between residual unreacted metal and $B_4C$ or B—Al—C reaction products (e.g., $AlB_2$; $AlB_{12}$; $AlB_{12}C_2$; $Al_4C_3$; $AlB_{24}$, $C_4$; $Al_4B_{1\text{-}3}C_4$; $AlB_{24}C_4$ and $Al_4BC$) or both. The reactions promote reduction of free (unreacted) metal and development of a uniform microstructure.

The post-infiltration heat treatment has a duration that typically ranges from 1 to 100 hours, desirably from 10 to 75 hours and preferably from 25 to 75 hours. A duration in excess of 100 hours increases production costs but yields little or no improvements in microstructure over those occurring at 100 hours.

After the body is formed, it may be machined to a particular shape by suitable methods such as those known in the art (e.g., diamond grinding and electro-discharge machining).

Preparing the Abrasive Article:

In forming the abrasive article, the body is heated, under a vacuum or inert atmosphere, in the presence of a separate source of aluminum, such that at least a portion of the surface of said body is contacted by liquid or vaporous aluminum for a time and temperature sufficient to form the aluminum-boron-carbon abrasive article.

The body and separate source of aluminum are heated under an inert atmosphere or vacuum. An inert atmosphere is any atmosphere that essentially fails to react, at the heating temperature, with either the body or aluminum being heated. Examples of an inert atmosphere include noble gases and nitrogen. A suitable vacuum generally corresponds to a pressure of at most about 100 millitorr, preferably the vacuum corresponds to a pressure of at most about 10 millitorr and most preferably at most about 1 millitorr. When forming the vacuum, the atmosphere is preferably first purged with an inert gas before forming the vacuum.

The source of aluminum may be aluminum metal or alloy thereof. The aluminum source may be directly contacted with the body where, upon heating, the aluminum melts such that the liquid aluminum directly contacts a portion of the surface of the body. The aluminum source may be placed separately in a furnace with the body such that a sufficient amount of vaporous aluminum contacts the body to form the abrasive article. The aluminum source may be liquid contained in a refractory crucible, such as a graphite, tungsten, aluminum oxide or boron carbide crucible, where the body is, subsequently, at least partially immersed in the liquid aluminum.

A portion or the entire surface of the body may be contacted with the separate source of aluminum. When only a portion of the surface of the body is to be contacted, the body may be coated with a barrier layer such that the coated portion is not contacted by the aluminum. The coating may be removed after the formation of the abrasive article (i.e., after cooling the furnace and removing the part), for example, by mechanical means, such as sand blasting and grinding. The barrier layer may be any material that essentially fails to react with aluminum and the body and forms a barrier that substantially prevents the growth of the abrasive grains on the body. Examples of barrier layer materials include boron nitride, aluminum nitride and graphite. The barrier may be applied as powder, such as by spraying or painting, or may be wrapped using a foil, such as graphite foil.

The amount of the separate source of aluminum may be any amount sufficient to form the abrasive article. The amount of the separate source of aluminum necessary depends, for example, upon the amount of surface of the body or bodies to be contacted and the phase and size of the abrasive grains desired. Generally, the amount of the separate source of aluminum is at least about 1 percent to at most about 100 percent by volume of the body or bodies to be contacted during heating. Preferably the amount is at most about 50 percent, more preferably at most about 40 percent and most preferably at most about 30 percent by volume of the body or bodies to be contacted. Excessive aluminum may be used to form the abrasive article but, generally, this is undesirable since it may require an extra step to remove aluminum metal from the surface of the abrasive article, for example, by chemically leaching with alkali or acid or mechanically by techniques, such as sand blasting.

The body and separate source of aluminum are heated for a time and temperature sufficient to form the abrasive article. The particular temperature and time, typically, are chosen depending on the size and chemistry of the abrasive grains desired where increased temperature and time, typically, result in larger abrasive grains. The temperature should be a temperature where the aluminum metal or alloy thereof is molten to a temperature below the boiling point of the metal. Preferably the temperature is least about 700° C., more preferably at least about 800° C. and most preferably at least about 900° C. to at most about 1500° C., more preferably at most about 1300° C., even more preferably at most about 1200° C. and most preferably at most about 1100° C. The time, generally, is as short a time that is practicable depending on the size and chemistry of the abrasive grains desired. Typically, the time is at least about 0.5 hour to at most about 24 hours. Preferably the time is at least about 1 hour, more preferably at least about 1.5 hours to preferably at most about 10 hours, more preferably at most about 5 hours and ost preferably at most about 2 hours.

The separate source of aluminum and body are heated in any suitable furnace, such as those known in the art. For example, the furnace may be a furnace where the hot zone is constructed of graphite, nickel-chromium wire, silicon carbide, molybdenum or tungsten. The furnace is preferably a furnace constructed of graphite, molybdenum or tungsten. Suitable furnaces are available from manufacturers such as CM Furnace Company, Bloomfield, N.J.; Thermal Technology Inc., Santa Rosa, Calif. and Centorr/Vacuum Industries, Nashua, N.H.

What is claimed is:

1. A method for preparing an aluminum-boron-carbon abrasive article comprising heating, under a vacuum or inert atmosphere, a substantially dense body comprised of at least one boron containing phase and at least one carbon containing phase, the boron and carbon containing phase each being selected from the group consisting of: $B_4C$; $AlB_2$; $AlB_{12}$; $AlB_{12}C_2$; $Al_4C_3$; $AlB_{24},C_4$; $Al_4B_{1-3}C_4$; $AlB_{24}C_4$ and $Al_4BC$, in the presence of a separate source of aluminum such that at least a portion of the surface of said body is contacted by liquid or vaporous aluminum for a time and temperature sufficient to form the aluminum-boron-carbon abrasive article wherein a barrier coating is applied to at least a portion of the surface of the body before heating in the presence of the separate source of aluminum.

2. The method of claim 1, wherein the body is a boron carbide body or an aluminum-boron carbide composite body.

3. The method of claim 1, wherein the barrier coating is selected from the group consisting of boron nitride, aluminum nitride and graphite.

4. A method for preparing an aluminum-boron-carbon abrasive article comprising heating, under a vacuum or inert atmosphere, a body comprised of at least one boron containing phase and at least one carbon containing phase, the boron and carbon containing phase each being selected from the group consisting of: $B_4C$; $AlB_2$; $AlB_{12}$; $AlB_{12}C_2$; $Al_4C_3$; $AlB_{24},C_4$; $Al_4B_{1-3}C_4$; $AlB_{24}C_4$ and $Al_4BC$, in the presence of a separate source of aluminum such that at least a portion of the surface of said body is contacted by liquid or vaporous aluminum for a time and temperature sufficient to form the aluminum-boron-carbon abrasive article wherein a barrier coating is applied to at least a portion of the surface of the body before heating in the presence of a separate source of aluminum.

* * * * *